(12) United States Patent
Guo et al.

(10) Patent No.: US 11,876,274 B2
(45) Date of Patent: Jan. 16, 2024

(54) MEMS PHASE SHIFTER INCLUDING A SIGNAL LINE, GROUND LINES AND A FILM BRIDGE FORMED ON A SUBSTRATE TO PROVIDE FOR CAPACITIVE ADJUSTMENT OF THE PHASE SHIFTER

(71) Applicant: BOE Technology Group Co., Ltd., Beijing (CN)

(72) Inventors: Jingwen Guo, Beijing (CN); Chunxin Li, Beijing (CN); Qianhong Wu, Beijing (CN); Yanzhao Li, Beijing (CN); Feng Qu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 198 days.

(21) Appl. No.: 17/443,566

(22) Filed: Jul. 27, 2021

(65) Prior Publication Data

US 2022/0140460 A1   May 5, 2022

(30) Foreign Application Priority Data

Oct. 30, 2020  (CN) .......................... 202011197228.6

(51) Int. Cl.
*H01P 1/18*     (2006.01)
*H01Q 1/48*    (2006.01)
*H01Q 3/36*    (2006.01)

(52) U.S. Cl.
CPC .............. *H01P 1/181* (2013.01); *H01P 1/184* (2013.01); *H01Q 1/48* (2013.01); *H01Q 3/36* (2013.01)

(58) Field of Classification Search
CPC .... H01P 9/00; H01P 1/18; H01P 1/181; H01P 1/184; H01P 1/185; H01P 1/10
(Continued)

(56) References Cited

U.S. PATENT DOCUMENTS 5,607,631 A * 3/1997 Wolfson et al. ........ H01P 1/181
                                                    264/177.11
2003/0146806 A1* 8/2003 Nuecther et al. ....... H01P 1/184
                                                    333/156
(Continued)

FOREIGN PATENT DOCUMENTS

CN          1601685 A      3/2005
CN        101743665 A      6/2010

OTHER PUBLICATIONS

The First Office Action dated Nov. 2, 2022 corresponding to Chinese application No. 202011197228.6.

*Primary Examiner* — Benny T Lee
(74) *Attorney, Agent, or Firm* — Nath, Goldberg & Meyer; Joshua B. Goldberg

(57) ABSTRACT

A phase shifter and an antenna device are provided. The phase shifter includes a substrate, a signal line on the substrate, ground lines in pairs on the substrate, and a capacitance adjusting component. Two ground lines in a same pair of ground lines are on both sides of the signal line and spaced apart from the signal line, respectively. The capacitance adjusting component includes a film bridge, and both ends of the film bridge are on the two ground lines, respectively. The signal line is in a space enclosed by the film bridge and the substrate. The capacitance adjusting component is configured to adjust a capacitance between the film bridge and the signal line to a target capacitance when the capacitance adjusting component receives a bias voltage, and the target capacitance has a linear correlation with a magnitude of the bias voltage.

20 Claims, 8 Drawing Sheets

(58) Field of Classification Search
USPC .......................................................... 333/161
See application file for complete search history.

(56) References Cited

U.S. PATENT DOCUMENTS

2008/0272857 A1* 11/2008 Singh ...................... H01P 1/184
333/161
2020/0102213 A1    4/2020  Haridas et al.

* cited by examiner

MEMS PHASE SHIFTER INCLUDING A SIGNAL LINE, GROUND LINES AND A FILM BRIDGE FORMED ON A SUBSTRATE TO PROVIDE FOR CAPACITIVE ADJUSTMENT OF THE PHASE SHIFTER

CROSS REFERENCE TO RELATED APPLICATIONS

The present application claims priority to Chinese patent application No. 202011197228.6, filed on Oct. 30, 2020, the content of which is incorporated herein by reference in its entirety.

TECHNICAL FIELD

The present disclosure relates to the field of electronic technology, and in particular, to a phase shifter and an antenna device.

BACKGROUND

A phase shifter is a device capable of adjusting a phase of a wave. The phase shifter is widely applied to the fields of radar, missile attitude control, accelerators, communication, instruments, and even music. Conventional phase shifters include a ferrite phase shifter and a semiconductor phase shifter, which are mainly implemented by using a ferrite material, and switches such as positive-intrinsic-negative (PIN) diodes or field effect transistors. The ferrite phase shifter has a large power capacity and a small insertion loss, but the disadvantages of complex process, expensive manufacturing cost, large volume and the like limit the large-scale application of the ferrite phase shifter. The semiconductor phase shifter has a small volume and a high operating speed, but has disadvantages of small power capacity, high power consumption and high difficulty in manufacturing. Compared with the conventional phase shifters, a micro-electromechanical system (MEMS) phase shifter has the advantages of smaller volume, lighter weight, shorter control time, smaller insertion loss, larger loadable power and the like, and has bright prospects of rapid development and wide application.

SUMMARY OF THE INVENTION

A first aspect of the present disclosure provides a phase shifter, which includes: a substrate, a signal line on the substrate, ground lines in pairs on the substrate, and a capacitance adjusting component, wherein, two ground lines in a same pair of ground lines are on both sides of the signal line and spaced apart from the signal line, respectively, the capacitance adjusting component includes a film bridge, both ends of the film bridge are on the two ground lines, respectively, the signal line is in a space enclosed by the film bridge and the substrate, the capacitance adjusting component is configured to adjust a capacitance between the film bridge and the signal line to a target capacitance when the capacitance adjusting component receives a bias voltage, and the target capacitance has a linear correlation with a magnitude of the bias voltage.

In an embodiment, the film bridge includes two connection walls and a bridge floor structure that is opposite to the substrate, the two connection walls are connected to both ends of the bridge floor structure, respectively, and are on the two ground lines, respectively, the capacitance adjusting component further includes a plurality of dielectric pillars vertically on a surface of the signal line proximal to the bridge floor structure, and each of the plurality of dielectric pillars includes a ferroelectric material.

In an embodiment, a cross section of each of the plurality of dielectric pillars has a shape of a circle, a triangle, or a rectangle.

In an embodiment, each of the plurality of dielectric pillars is a cylinder, a cone, a frustum of a cone, a triangular prism, or a quadrangular prism.

In an embodiment, the bridge floor structure includes an electrode portion opposite to the signal line, a dimension of the electrode portion is greater than a dimension of the signal line in a direction perpendicular to an extension direction (i.e., a lengthwise direction) of the signal line, and the phase shifter further includes a plurality of additional dielectric pillars vertically on the substrate and at a periphery of the plurality of dielectric pillars.

In an embodiment, a central axis of each of the plurality of dielectric pillars is perpendicular to the substrate.

In an embodiment, the ferroelectric material includes at least one of a lead zirconate titanate piezoelectric ceramic (PZT), barium titanium oxide (BaTiO), lead magnesium niobate-lead titanate (PMNPT), and bismuth iron oxide ($BiFeO_3$).

In an embodiment, the electrode portion at least partially overlaps the signal line in a direction perpendicular to the substrate.

In an embodiment, the film bridge includes two connection walls and a bridge floor structure that is opposite to the substrate, the two connection walls are connected to both ends of the bridge floor structure, respectively, and are on the two ground lines, respectively, the bridge floor structure includes an electrode portion, two adsorption portions, and a plurality of first connection bars, the electrode portion is opposite to the signal line, the two adsorption portions are connected to both sides of the electrode portion, respectively, each of the two adsorption portions is connected to one of the two connection walls through the plurality of first connection bars, and the two adsorption portions correspond to positions of the two ground lines, respectively.

In an embodiment, the bridge floor structure further includes a plurality of second connection bars, and each of the two adsorption portions is connected to the electrode portion through the plurality of second connection bars.

In an embodiment, the plurality of first connection bars includes two first connection bars, the plurality of second connection bars includes two second connection bars, each of the two adsorption portions is connected to one of the two connection walls through the two first connection bars, and is connected to the electrode portion through the two second connection bars.

In an embodiment, the phase shifter further includes a first switch unit on the substrate, and the first switch unit is configured to provide the bias voltage to the film bridge upon receiving a first control signal.

In an embodiment, the first switch unit has a bias voltage input terminal, a first output terminal, and a first control terminal, the bias voltage input terminal is configured to receive the bias voltage, the first output terminal is electrically connected to the film bridge, and the first switch unit is configured to electrically connect the first output terminal to the bias voltage input terminal when the first control terminal receives the first control signal.

In an embodiment, the first switch unit includes a first switch transistor, which has a first electrode serving as the bias voltage input terminal of the first switch unit, a second electrode serving as the first output terminal of the first switch unit, and a control electrode serving as the first control terminal of the first switch unit, and the first switch transistor is configured to electrically connect the first electrode to the second electrode when the control electrode receives the first control signal.

In an embodiment, the phase shifter further includes a second switch unit on the substrate, and the second switch unit is configured to electrically connect the signal line to the film bridge upon receiving a second control signal.

In an embodiment, the second switch unit includes a second switch transistor, which has a first electrode connected to the film bridge, a second electrode connected to the signal line, and a control electrode for receiving the second control signal, and the second switch transistor is configured to electrically connect the signal line to the film bridge when the control electrode receives the second control signal.

In an embodiment, the first switch unit is further configured to electrically connect the signal line to the film bridge upon receiving a second control signal.

In an embodiment, the first switch unit is a MEMS single-pole double-throw switch.

A second aspect of the present disclosure provides an antenna device, which includes a plurality of antenna units and a radio frequency signal supply circuit, wherein each of the plurality of antenna units includes a radio frequency antenna and at least one phase shifter connected to the radio frequency antenna, the radio frequency signal supply circuit is configured to supply a radio frequency signal to the radio frequency antenna through the at least one phase shifter, each of the at least one phase shifter is the phase shifter according to any one of the foregoing embodiments of the first aspect of the present disclosure, and each of the plurality of antenna units further includes a bias voltage supply circuit configured to supply the bias voltage to the capacitance adjusting component of each of the at least one phase shifter.

In an embodiment, the antenna device further includes a plurality of main switch units connected in one-to-one correspondence with the plurality of antenna units, and each antenna unit further including at least one sub-switch unit in one-to-one correspondence with the at least one phase shifter, wherein each phase shifter is connected to the main switch unit corresponding to the antenna unit including the phase shifter through a corresponding sub-switch unit, the bias voltage supply circuit is configured to supply a control signal to the at least one sub-switch unit through a corresponding main switch unit, so as to selectively turn on the at least one sub-switch unit, and each phase shifter is configured to provide a radio frequency signal to the radio frequency antenna when the corresponding sub-switch unit is turned on.

BRIEF DESCRIPTION OF THE DRAWINGS

The accompanying drawings, which are provided for further understanding of the present disclosure and constitute a part of this specification, are for explaining the present disclosure together with the following exemplary embodiments, but are not intended to limit the present disclosure. In the drawings.

DETAILED DESCRIPTION OF THE INVENTION

Figure 1:
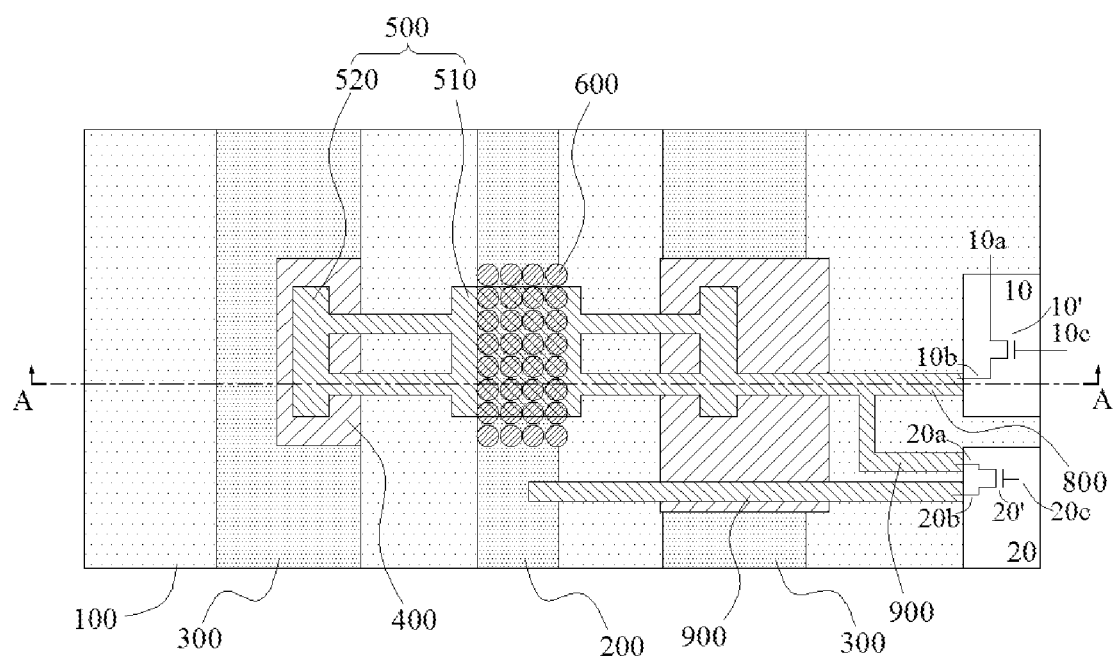
FIG. 1 is a schematic diagram (e.g., a top view) showing a structure of a phase shifter according to an embodiment of the present disclosure.

Exemplary embodiments of the present disclosure will be described in detail below with reference to the accompanying drawings. It should be understood that the exemplary embodiments described herein are only for illustrating and explaining the present disclosure, but are not intended to limit the present disclosure.

The inventors of the present inventive concept have found that, in an existing MEMS phase shifter, a middle portion of a metal film bridge is suspended above a coplanar waveguide signal line with an air gap between the signal line and the metal film bridge. Each metal film bridge and the signal line form a switch, and electrostatic adsorption can occur between the middle portion of the metal film bridge and the signal line by providing a bias voltage signal (which may also be referred to as a bias voltage or a voltage difference) Vs to the metal film bridge, such that the metal film bridge is pulled down to a certain position above a dielectric isolation layer on the signal line, and a capacitance between the metal film bridge and the signal line is changed, thereby changing a phase of a radio frequency signal transmitted on the signal line.

However, in the conventional MEMS phase shifter, the switch formed by each metal film bridge and the signal line can only be switched between a turn-on state and a turn-off state, i.e., the capacitance between the metal film bridge and the signal line can only be switched between two values. Therefore, an adjustment amount of each switch for adjusting a phase of a radio frequency signal is a fixed value, and a phase adjustment capability of a single switch is limited. Thus, the phase of the radio frequency signal transmitted on the signal line can only be adjusted by changing the number of the switches, which are turned on, of a plurality of series-connected switches.

Therefore, it is a technical problem to be solved urgently in the art to provide a phase shifter with a better phase adjustment capability.

At least to solve the above technical problems, some embodiments of the present disclosure provide a phase shifter with a better phase adjustment capability and an antenna device including the phase shifter.

As an aspect of the present disclosure, there is provided a phase shifter, as shown in FIGS. 1-2, and 4-8. The phase shifter includes a substrate 100, a signal line 200 arranged on the substrate 100, ground lines 300 arranged in pairs (i.e., in sets of two) on the substrate 100, and at least one capacitance adjusting component.

For example, two ground lines 300 in a same pair (i.e., one single pair, or any one pair) of ground lines 300 are located on both sides of the signal line 200 and spaced apart from the signal line 200, respectively. The capacitance adjusting component includes a film bridge 500 (FIG. 1), and both ends of the film bridge 500 are disposed on the two ground lines 300, respectively. The signal line 200 is located in a space enclosed by the film bridge 500 and the substrate 100. The capacitance adjusting component (e.g., the film bridge 500) may adjust the capacitance between the film bridge 500 and the signal line 200 to a target capacitance when the capacitance adjusting component receives a bias voltage, and the target capacitance has a linear correlation with a magnitude of the bias voltage. It should be understood that only one film bridge 500 is illustrated in FIGS. 1-2 and 4-8 for convenience of illustration, but an embodiment of the present disclosure is not limited thereto. Alternatively, the phase shifter according to an embodiment of the present disclosure may include a plurality of (i.e., two or more) film bridges 500. For example, the plurality of film bridges 500 (which correspond to a plurality of capacitance adjusting components) may have the same structure, and may be disposed side by side and spaced apart from each other on the two ground lines 300 in an extension direction (i.e., a lengthwise direction, such as a vertical direction in FIG. 1) of the signal line 200.

In the phase shifter according to the present embodiment, the capacitance adjusting component can adjust the capacitance between the film bridge 500 and the signal line 200 to the target capacitance according to the magnitude of the bias voltage, and the target capacitance can be freely changed within a certain range according to the magnitude of the bias voltage. That is, during the operation of the phase shifter, the capacitance between a single film bridge 500 and the signal line 200 is continuously adjustable, thereby achieving continuous adjustment of the phase of the radio frequency signal transmitted on the signal line 200 through the single film bridge 500. Compared with the scheme that a single switch of the conventional MEMS phase shifter can only be switched between a turn-on state and an a turn-off state (i.e., can only adjust the phase of the radio frequency signal by a fixed amplitude), the present embodiment greatly improves a phase shifting capability of the phase shifter.

Figure 2:
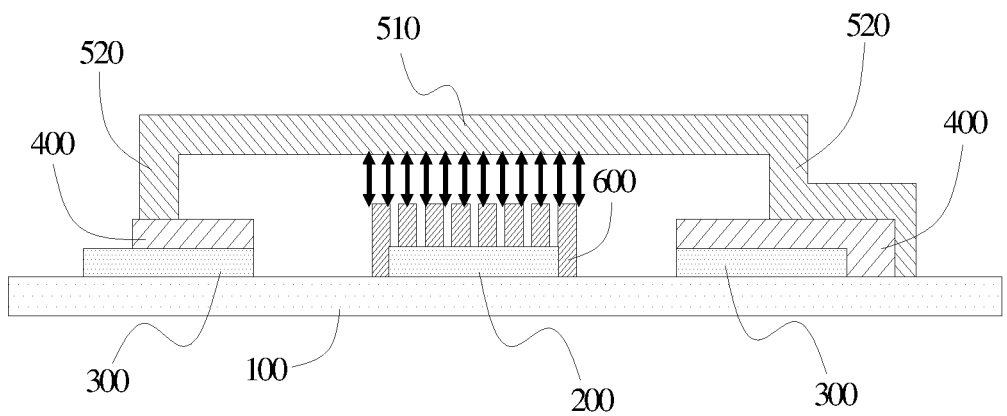
FIG. 2 is a cross-sectional view of the phase shifter shown in FIG. 1 taken along a line A-A.

The structure of the film bridge 500 is not particularly limited in an embodiment of the present disclosure. For example, as an optional embodiment of the present disclosure, as shown in FIGS. 1-2, the film bridge 500 includes two connection walls 520 and a bridge floor structure (which may also be referred to as a bridge deck structure) 510 disposed opposite to the substrate 100. The two connection walls 520 are connected to both ends of the bridge floor structure 510, respectively, and are disposed on the two ground lines 300, respectively.

A material of the film bridge 500 is not particularly limited in an embodiment of the present disclosure. For example, the material of the film bridge 500 may optionally include a metal material such as aluminum, copper, silver, gold, or the like.

In order to improve a safety of the phase shifter and prevent the film bridge 500 from contacting the ground lines 300 to cause an electric leakage, as an example, an insulating isolation layer 400 is disposed between each of the ground lines 300 and a corresponding connection wall 520, as shown in FIGS. 1-2.

An embodiment of the present disclosure does not particularly limit a method in which the capacitance adjusting component adjusts the capacitance between the film bridge 500 and the signal line 200 to the target capacitance according to the magnitude of the bias voltage. For example, as a first exemplary embodiment of the present disclosure, as shown in FIGS. 1-2 and 4-5, the capacitance adjusting component further includes a plurality of dielectric pillars 600 vertically disposed on a surface of the signal line 200 proximal to the bridge floor structure 510, and a material of each of the plurality of dielectric pillars 600 includes a ferroelectric material. For example, each dielectric pillar 600 is vertically disposed, which may mean that a central axis of each dielectric pillar 600 is perpendicular to the substrate 100.

In the phase shifter according to the present embodiment, the plurality of dielectric pillars 600 (a dimension of a cross section of each of which is in an order of nanometer) are vertically disposed on the signal line 200. As such, after the bridge floor structure 510 of the film bridge 500 and the dielectric pillars 600 including the ferroelectric material are adsorbed to each other and in contact with each other, an electric field applied to the dielectric pillars 600 can be further changed (e.g., increased) by continuously increasing a direct current (DC) bias voltage, such that a dielectric constant (i.e., a permittivity) of the ferroelectric nano-pillars (i.e., the dielectric pillars 600) is changed, thereby further changing the capacitance between the film bridge 500 and the signal line 200. Thus, after the mutual adsorption and the mutual contact occur, the phase of the radio frequency signal transmitted on the signal line 200 can be further continuously adjusted. As a result, the phase shifting capability of the phase shifter is improved.

Figure 4:
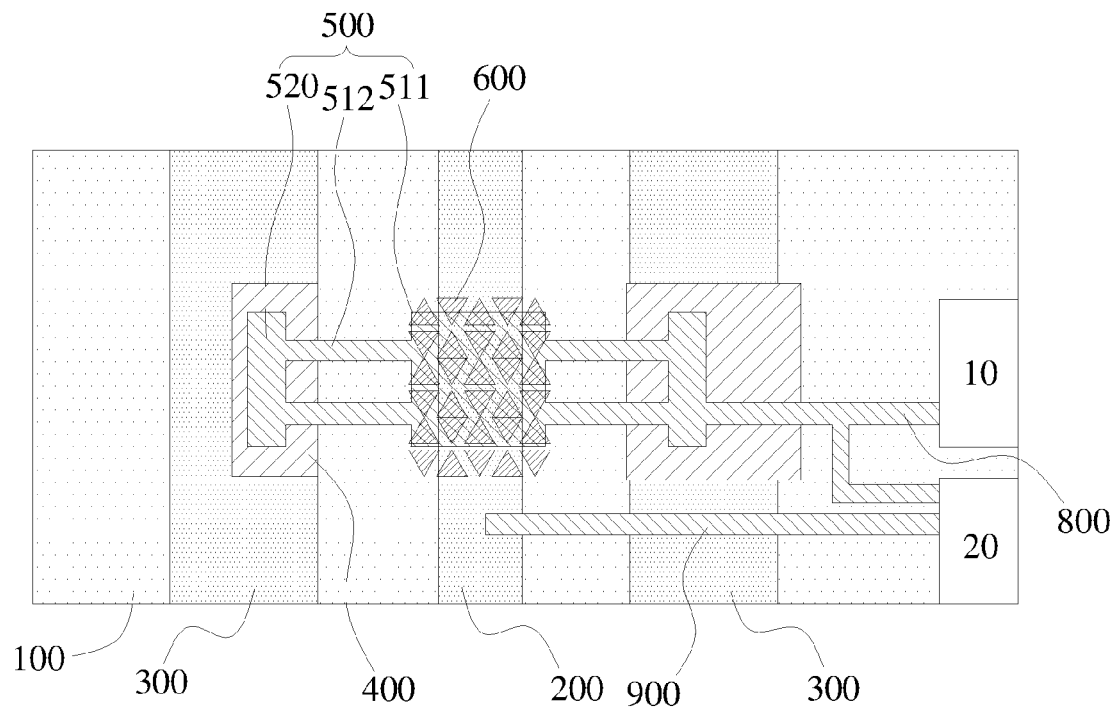
FIG. 4 is a schematic diagram (e.g., a top view) showing a structure of a phase shifter according to another embodiment of the present disclosure.
Figure 5:
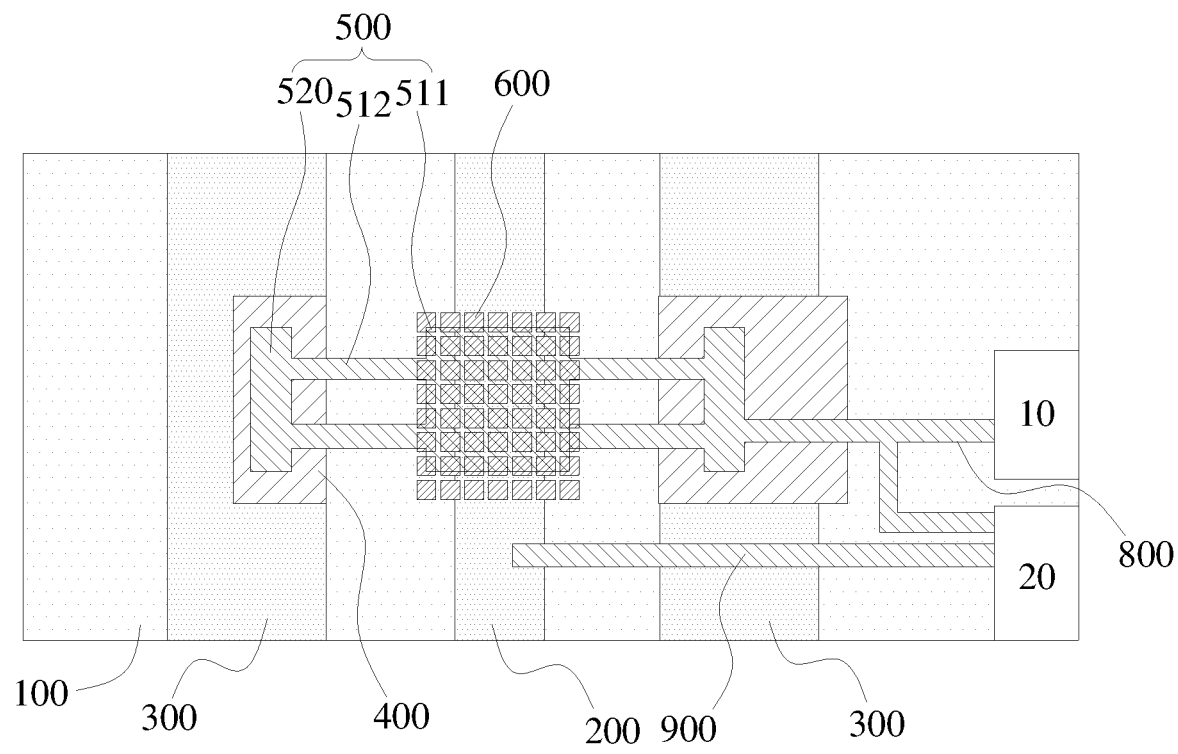
FIG. 5 is a schematic diagram (e.g., a top view) showing a structure of a phase shifter according to another embodiment of the present disclosure.

A shape of each of the dielectric pillars (e.g., the nano-pillars) 600 is not particularly limited in an embodiment of the present disclosure, and may be suitably designed in consideration of an orientation of a ferroelectric polarization axis thereof and according to a selected ferroelectric material, thereby further optimizing the phase shifting capability of the phase shifter. For example, as shown in FIG. 1, a cross section of each of the dielectric pillars 600 may alternatively have a shape of a circle. Alternatively, as shown in FIG. 4, the cross section of each of the dielectric pillars 600 may have shape of a triangle. Alternatively, as shown in FIG. 5, the cross section of each of the dielectric pillars 600 may have a shape of a rectangle. The dielectric pillars 600 are respectively disposed in a region where the bridge floor structure 510 (FIGS. 1 and 2) is opposite to the signal line 200 (e.g., a region where the bridge floor structure 510 and the signal line 200 overlap each other in a direction perpendicular to the substrate 100). For example, each of the dielectric pillars 600 may be a triangular prism, a quadrangular prism, a cylinder, a cone, or a frustum of a cone. In some embodiments, a dimension of an electrode portion 511 of the bridge floor structure 510 is greater than a dimension of the signal line 200 in a direction perpendicular to an extension direction (i.e., a lengthwise direction, such as a vertical direction in FIG. 1, 4 or 5) of the signal line 200. In this case, in order to prevent the film bridge 500 (FIG. 1) from being unable to continue operation (or avoid a case where the film bridge 500 cannot continue to operate) due to collapsing caused by the electrostatic effect of residual charges, the phase shifter may further include some additional dielectric pillars 600 vertically disposed on the substrate 100 and located at a periphery of the plurality of dielectric pillars 600, in addition to the plurality of dielectric pillars 600 located on the surface of the signal line 200 proximal to the bridge floor structure 510 as shown in FIG. 2. For example, the electrode portion 511 overlaps all of the dielectric pillars 600 in the direction perpendicular to the substrate 100.

A structure of the bridge floor structure 510 (FIG. 1) is not particularly limited in an embodiment of the present disclosure. For example, as an optional embodiment of the present disclosure, as shown in FIGS. 1 and 4-5, the bridge floor structure 510 may include the electrode portion (e.g., a portion of the bridge floor structure 510 directly above the signal line 200) 511 (FIGS. 4 and 5) and a plurality of second connection bars 512, and each of the two connection walls 520 is connected to the electrode portion 511 through the plurality of second connection bars 512, as shown in FIGS. 4 and 5.

A shape of the electrode portion 511 is not particularly limited in an embodiment of the present disclosure. For example, as shown in FIGS. 4 and 5, the electrode portion 511 may optionally have a shape of a rectangle.

The number of the second connection bars 512 connected between the electrode portion 511 and each of the connection walls 520 is not particularly limited in an embodiment of the present disclosure. For example, as an exemplary embodiment of the present disclosure, as shown in FIGS. 4 and 5, each of the connection walls 520 is connected to the electrode portion 511 by two second connection bars 512. As such, an amount of material used for the bridge floor structure 510 is reduced to reduce the manufacturing cost of the phase shifter, and meanwhile, the stability of a bridge floor thereof is improved to prevent the bridge floor from turning over. Alternatively, in other embodiments, the number of the second connection bars 512 connected between the electrode portion 511 and each of the connection walls 520 may be greater than or equal to 3.

The inventors of the present inventive concept have also found in research that, the reason why the conventional MEMS phase shifter can only switch between the turn-on state and the turn-off state and a single conventional MEMS phase shifter cannot continuously adjust a phase, lies in that the linearity between the bias voltage Vs and the pull-down displacement of the bridge floor of the phase shifter (or between the bias voltage Vs and the capacitance between the bridge floor structure 510 and the signal line 200) is poor.

Figure 9:
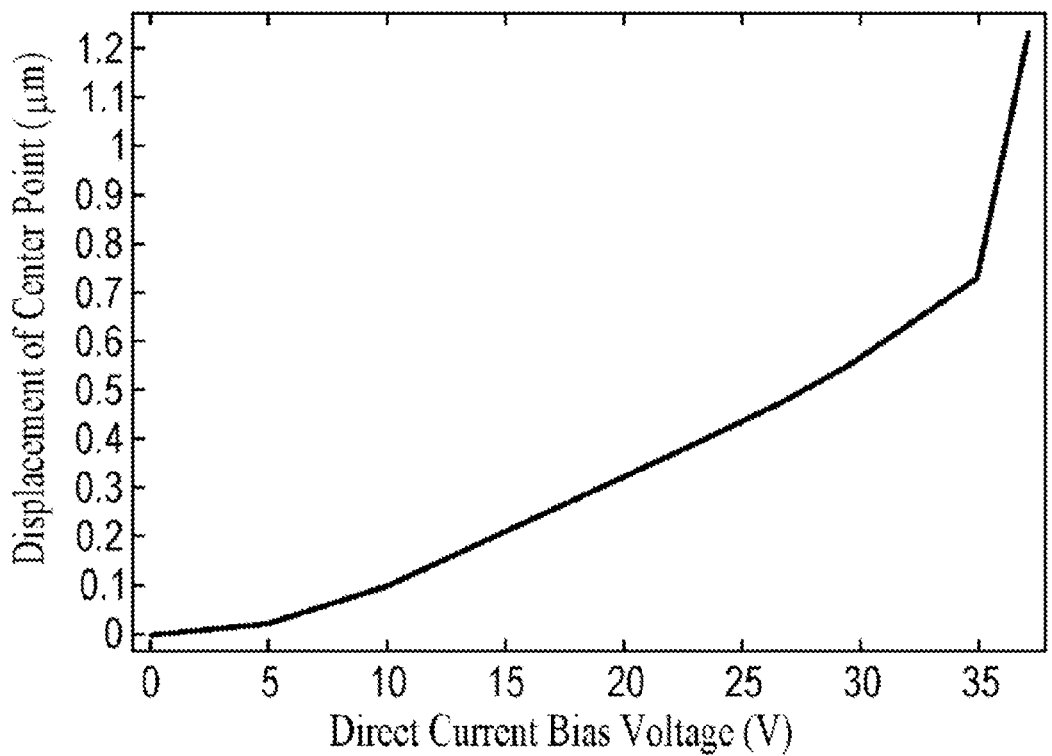
FIG. 9 is a schematic graph illustrating that a displacement of a center point of a film bridge of a conventional phase shifter is changed as a bias voltage is changed.

Specifically, FIG. 9 is a schematic diagram illustrating that a displacement of a center point in μm of a film bridge of the conventional MEMS phase shifter is changed as a bias voltage in V is changed. The curve shown in FIG. 9 is plotted according to test results of 8 bias voltages of 0 V, 5 V, 10 V, 15 V, 20 V, 25 V, 30 V and 35 V. As can be seen from FIG. 9, in the conventional MEMS phase shifter, the film bridge is driven to be pulled down by the electrostatic effect between the signal line and the film bridge, and the mutual adsorption and the mutual contact will occur after the film bridge is pulled down by one third of a distance between the signal line and the film bridge, such that the linearity between the pull-down displacement of the film bridge (or the capacitance between the film bridge and the signal line) and the bias voltage is poor. Further, a range in which the phase shifter has the largest phase shift corresponds to the last 5% portion of a bias voltage variation range, and therefore, it is difficult to achieve stable and continuous control of the pull-down displacement.

Figure 6:
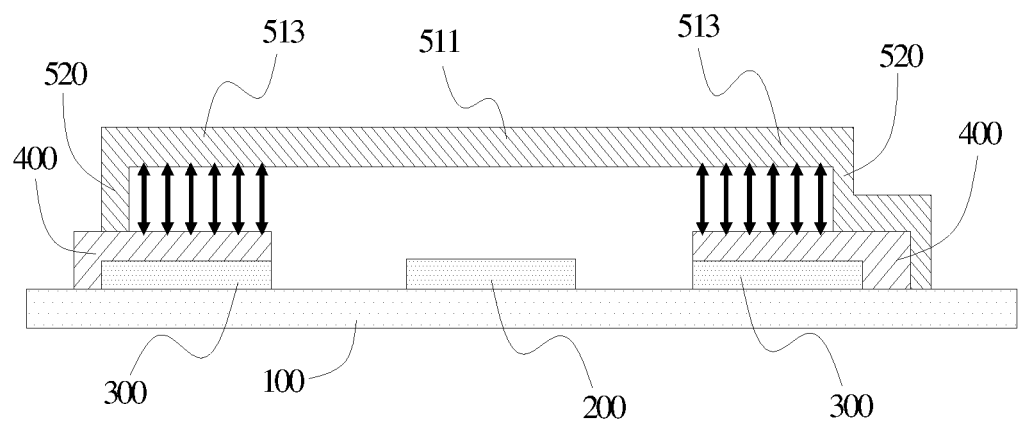
FIG. 6 is a schematic view (e.g., a cross-sectional view) showing a structure of a phase shifter according to another embodiment of the present disclosure.
Figure 7:
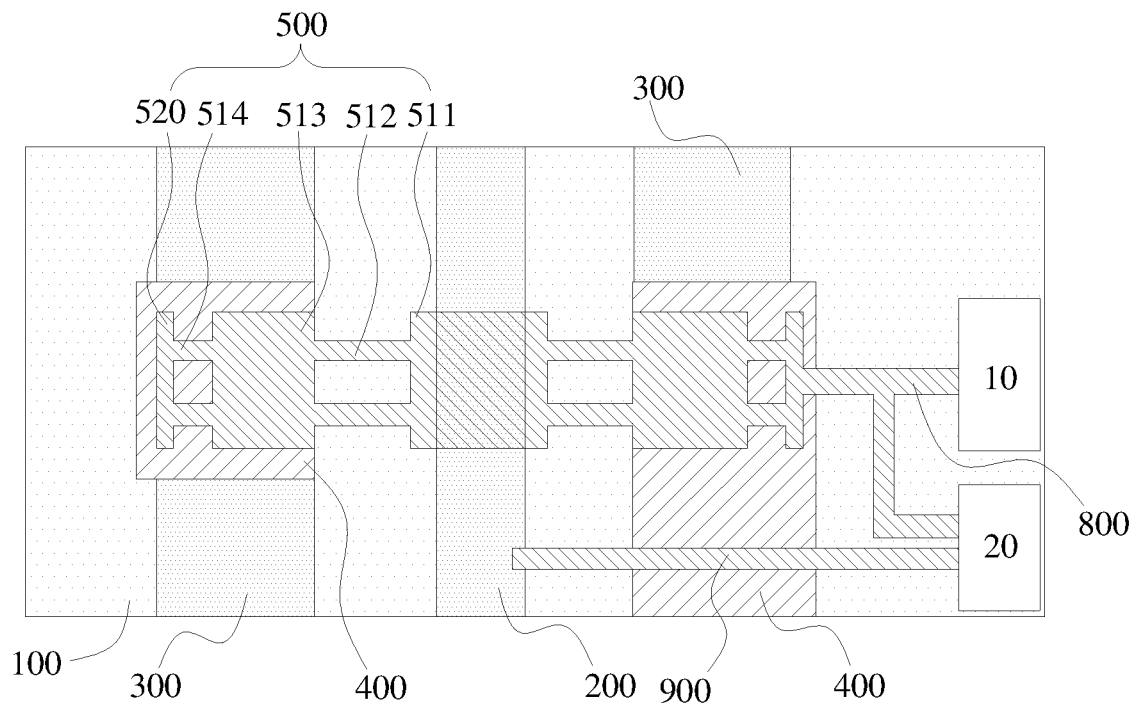
FIG. 7 is a top view of the phase shifter shown in FIG. 6.
Figure 8:
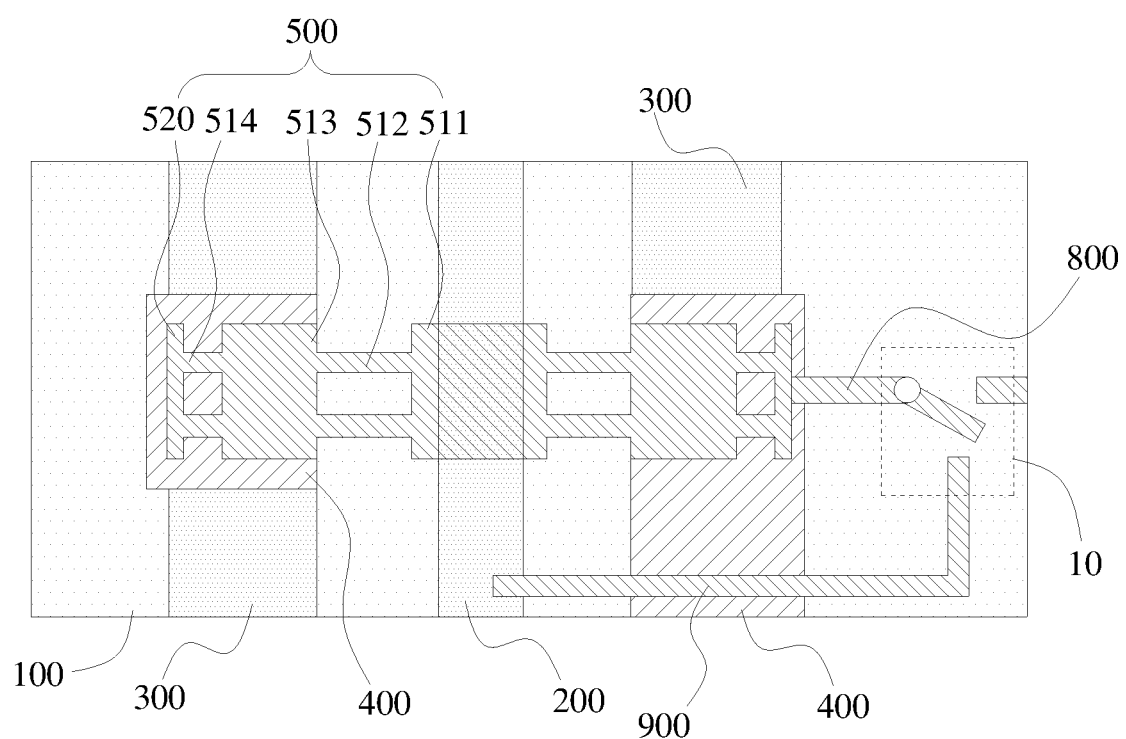
FIG. 8 is a schematic diagram (e.g., a top view) showing a structure of a phase shifter according to an embodiment of the present disclosure.

In order to solve at least the above technical problems, a phase shifter with a better phase adjustment capability is provided, as a second exemplary embodiment of the present disclosure as shown in FIGS. 6-8. The bridge floor structure 510 (FIGS. 1 and 2) includes the electrode portion 511, two adsorption portions 513, and a plurality of first connection bars 514 (FIGS. 7 and 8). The electrode portion 511 is disposed opposite to the signal line 200 (e.g., the electrode portion 511 and the signal line 200 at least partially overlap each other in the direction perpendicular to the substrate 100), and the two adsorption portions 513 are connected to both sides of the electrode portion 511. Each of the two adsorption portions 513 is connected to one of the two connection walls 520 through the plurality of first connection bars 514 (FIGS. 7 and 8), and the two adsorption portions 513 correspond to positions of the two ground lines 300, respectively (e.g., in the direction perpendicular to the substrate 100, the two adsorption portions 513 at least partially overlap the two ground lines 300, respectively).

Figure 10:
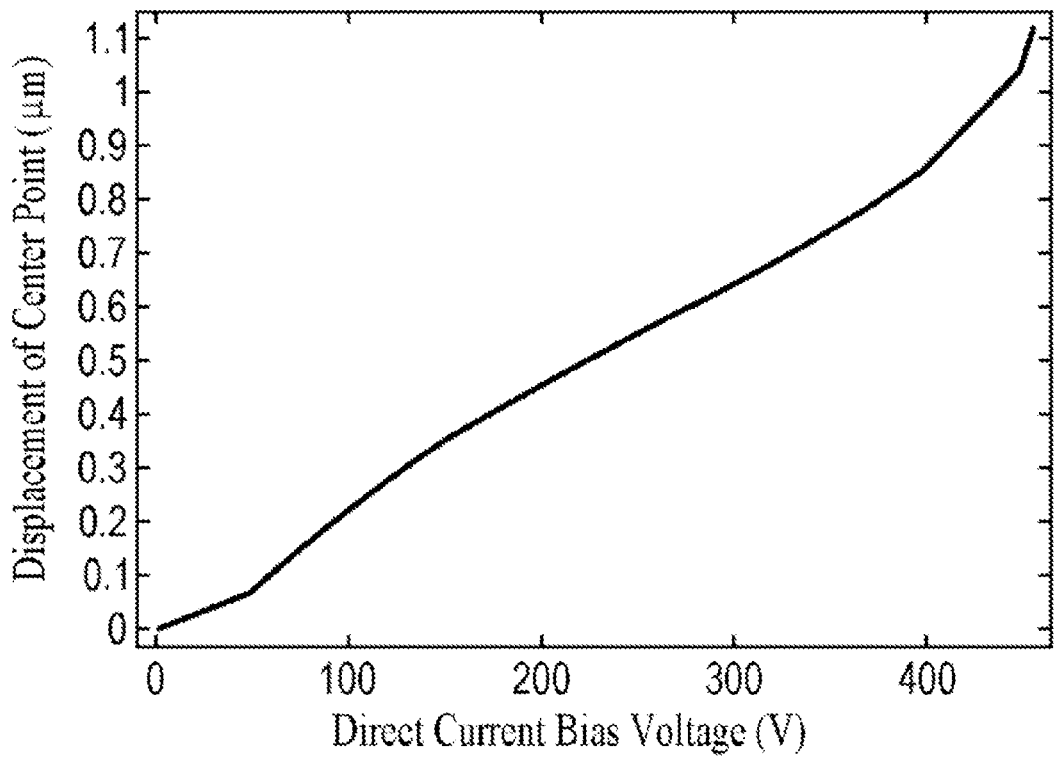
FIG. 10 is a schematic graph illustrating that a displacement of a center point of a film bridge of a phase shifter according to an embodiment of the present disclosure is changed as a bias voltage is changed.

FIG. 10 is a schematic diagram illustrating that a displacement of a center point in μm of a film bridge of the phase shifter according to an embodiment of the present disclosure is changed as a bias voltage in V is changed. The curve shown in FIG. 10 is plotted according to test results of 9 bias voltages of 0 V, 50 V, 100 V, 150 V, 200 V, 250 V, 300 V, 350 V, and 400 V. As can be seen from FIG. 10, in the phase shifter according to an embodiment of the present disclosure, the film bridge 500 (FIGS. 7 and 8) is driven to be pulled down by an electric field formed between each adsorption portion 513 and the corresponding ground line 300, thereby changing the distance between the bridge floor structure 510 and the signal line 200. As such, the pull-down displacement of the film bridge 500 (or the capacitance between the film bridge 500 and the signal line 200) and the magnitude of the bias voltage have a good linearity (i.e., linear relationship), such that the pull-down displacement of the film bridge can be accurately controlled, and a continuous phase adjustment can be realized.

In the present embodiment as shown in FIGS. 6-8, the two adsorption portions 513 are connected to each of two sides of the electrode portion 511 of the bridge floor structure 510, and the two adsorption portions 513 correspond to the positions of the two ground lines 300, respectively. Thus, after the bias voltage signal is supplied to the film bridge 500, the two adsorption portions 513 on both sides of the electrode portion 511 are respectively adsorbed to the corresponding ground lines 300, and the film bridge is driven to be pulled down by the electric field generated between each adsorption portion 513 and the corresponding ground line 300, thereby changing the distance between the bridge floor structure 510 and the signal line 200. During this pull-down process, a deformation of the film bridge 500 occurs mainly at each of the adsorption portions 513 at an edge of the bridge floor, while the displacement of the center point of the bridge floor has a good linear relationship with the bias voltage. Therefore, the pull-down displacement of the bridge floor of the film bridge 500 can be accurately controlled by changing the magnitude of the bias voltage, and continuous phase adjustment can be realized through a single phase shifter.

In order to reduce the material consumption of the bridge floor structure 510 and reduce the manufacturing cost of the phase shifter, for example, as shown in FIGS. 6-8, the bridge floor structure 510 further includes a plurality of second connection bars 512, and each of the two adsorption portions 513 is connected to the electrode portion 511 through the plurality of second connection bars 512 (FIGS. 7 and 8).

The number of the second connection bars 512 connected between the electrode portion 511 and each of the connection walls 520 and the number of the first connection bars 514 (FIGS. 7 and 8) connected between each of the adsorption portions 513 and the electrode portion 511 are not particularly limited in an embodiment of the present disclosure. For example, as an exemplary embodiment of the present disclosure, as shown in FIGS. 6-8, each of the two adsorption portions 513 is connected to one of the two connection walls 520 through the two first connection bars 514 (FIGS. 7 and 8), and is connected to the electrode portion 511 through the two second connection bars 512. As such, the amount of material used for the bridge floor structure 510 is reduced to reduce the manufacturing cost of the phase shifter, and meanwhile, the stability of the bridge floor is improved to prevent the bridge floor from turning over.

To further improve the phase adjustment capability of the phase shifter, as shown in FIGS. 1-2 and 4-8, the phase shifter further includes a first switch unit 10 disposed on the substrate 100, and the first switch unit may provide the bias voltage signal to the film bridge 500 when the first switch unit 10 receives a first control signal, as shown in FIGS. 1, 4-5 and 7-8.

The phase shifter according to the present embodiment further includes the first switch unit 10 disposed on the substrate 100, and the first switch unit 10 can perform individual potential control on the film bridge 500 of the phase shifter in which the first switch unit is located under the control of the first control signal, such that when the plurality of phase shifters according to an embodiment of the present disclosure are used as a plurality of phase shifting units to form a complex control circuit (such as an array antenna), the first control signal may be sent to each first switch unit 10, to independently control operating states of different phase shifting units. As such, a phase shifting degree can be accurately adjusted, and circuit-level control of a target device can be realized.

A circuit structure of the first switch unit 10 is not particularly limited in an embodiment of the present disclosure. For example, as an optional embodiment of the present disclosure, as shown in FIG. 1, the first switch unit 10 has a bias voltage input terminal 10$a$, a first output terminal 10$b$, and a first control terminal 10$c$. The bias voltage input terminal 10$a$ may receive the bias voltage signal, and the first output terminal 10$b$ is electrically connected to the film bridge 500 through a bias voltage output line 800. Further, the first switch unit 10 is capable of electrically connecting the first output terminal 10$b$ and the bias voltage input terminal 10$a$ to each other when the first control terminal 10$c$ receives the first control signal.

To simplify a manufacturing process of the phase shifter, the bias voltage output line 800 and the film bridge 500 may be exemplarily disposed in a same layer and may include a same material, i.e., may be formed by a same patterning process, as shown in FIG. 1.

For example, the circuit structure of the first switch unit 10 may be implemented by a thin film transistor (TFT). For example, the first switch unit 10 includes a first switch transistor 10', and a first electrode (e.g., a source) of the first switch transistor 10' serves as the bias voltage input terminal 10$a$ of the first switch unit 10. A second electrode (e.g., a drain) of the first switch transistor 10' serves as the first output terminal 10$b$ of the first switch unit 10 (i.e., the second electrode of the first switch transistor 10' is electrically connected to the film bridge 500 through the bias voltage output line 800), and a control electrode (e.g., a gate) of the first switch transistor 10' serves as the first control terminal of the first switch unit 10. The first switch transistor 10' is capable of electrically connecting the first electrode and the second electrode to each other when the control electrode receives the first control signal (e.g., a signal that turns the first switch transistor 10' on or off). Alternatively, the circuit structure of the first switch unit 10 may be implemented by a MEMS single-pole double-throw switch, which may electrically connect the bias voltage input terminal to the bias voltage output line 800, or electrically connect the signal line 200 to the film bridge 500 through the bias voltage output line 800 and a first connection line 900 to avoid a hysteresis effect as described below, as shown in FIG. 8.

The inventors of the present inventive concept have further found in research that, a precision of the existing phase shifter is reduced because initial capacitances of phase shifting units are not equal to each other in a working process due to the hysteresis effect caused by residual charges during frequent charging and discharging processes.

In order to solve at least the above technical problems and improve a control accuracy of the phase shifter, as an exemplary embodiment of the present disclosure, as shown in FIGS. 1, 4-5 and 7, the phase shifter further includes a second switch unit 20 disposed on the substrate 100, and the second switch unit 20 may electrically connect the signal line 200 to the film bridge 500 when the second switch unit 20 receives a second control signal. Specifically, as shown in FIGS. 1, 4-5 and 7, the second switch unit may be electrically connected to the signal line 200 through a second connection line 900, and electrically connected to the film bridge 500 through the bias voltage output line 800 and the first connection line 900. For example, a circuit structure of the second switch unit 20 may be implemented by a TFT, similar to the first switch unit 10. For example, as shown in FIG. 1, the second switch unit 20 includes a second switch transistor 20', and a first electrode (e.g., a source) 20$a$ of the second switch transistor 20' is connected to the first connection line 900. A second electrode (e.g., a drain) 20$b$ of the second switch transistor 20' is connected to the second connection line 900, and a control electrode (e.g., a gate) 20$c$ of the second switch transistor 20' serves as the second control terminal of the second switch unit 20 to receive the second control signal (e.g., a signal to turn the second switch transistor 20' on or off). The second switch transistor 20' is capable of electrically connecting the signal line 200 to the film bridge 500 when the second control terminal receives the second control signal.

In the phase shifter according to the present embodiment, the second switch unit 20 can electrically connect the signal line 200 and the film bridge 500 to each other when receiving the second control signal, so as to form a loop for releasing residual charges between the signal line 200 and the film bridge 500, thereby avoiding the hysteresis effect caused by residual charges during frequent charging and discharging processes of the phase shift units. As such, the consistency of the initial capacitances of the phase shifting units in a working process is improved, and the control precision of the phase shifter on the phase of the radio frequency signal is further improved.

In order to improve process compatibility of the phase shifter, as another exemplary embodiment of the present disclosure, as shown in FIG. 8, the first switch unit 10 may alternatively directly electrically connect the signal line 200 to the film bridge 500 upon receiving the second control signal.

As described above, as shown in FIG. 8, the circuit structure of the first switch unit 10 may be the MEMS single-pole double-throw switch. The single-pole double-throw switch may select a working loop to switch the working state of the phase shifter, such that the phase shifter can be switched between an external driving circuit and the loop for releasing residual charges.

As a second aspect of the present disclosure, there is provided a method for manufacturing a phase shifter, as shown in FIGS. 3(a) to 3(f). This manufacturing method may include the following steps S1 to S3.

In step S1, a substrate 100 is provided, as shown in FIG. 3 (a). For example, the substrate 100 may be made of glass, ceramic, quartz, or the like.

In step S2, a signal line 200 and two ground lines 300 are formed on the substrate 100, such that the two ground lines 300 are located on both sides of the signal line 200 and spaced apart from the signal line 200, respectively, as shown in FIG. 3 (a). For example, each of the signal line 200 and the two ground lines 300 may be made of a metal such as aluminum, copper, silver, gold, or the like.

In step S3, a capacitance adjusting component is formed such that the capacitance adjusting component includes a film bridge 500, both ends of the film bridge 500 are disposed on the two ground lines 300, respectively, and the signal line 200 is located in a space enclosed by the film bridge 500 and the substrate 100. The capacitance adjusting component is capable of adjusting a capacitance between the film bridge 500 and the signal line 200 to a target capacitance linearly correlated with a magnitude of a bias voltage upon receiving the bias voltage, as shown in FIGS. 3(b) to 3(f). For example, the film bridge 500 may be made of a metal such as aluminum, copper, silver, gold, or the like.

In the phase shifter manufactured by the method for manufacturing a phase shifter according to the present embodiment, the capacitance adjusting component can adjust the capacitance between the film bridge 500 and the signal line 200 to the target capacitance according to the magnitude of the bias voltage, and the target capacitance can be freely changed within a certain range according to the magnitude of the bias voltage. That is, during an operation of the phase shifter, the capacitance between a single film bridge 500 and the signal line 200 can be continuously adjusted, and thus the phase of the radio frequency signal transmitted on the signal line 200 can be continuously adjusted through the single film bridge 500. Compared with the scheme in which a single switch of the traditional MEMS phase shifter can only be switched between a turn-on state and a turn-off state, the method for manufacturing a phase shifter according to the present embodiment greatly improves the phase shifting capability of the phase shifter.

As an exemplary embodiment of the present disclosure, as shown in FIGS. 3(b) to 3(f), step S3 may include the following steps S31 and S32.

Figure 3A:
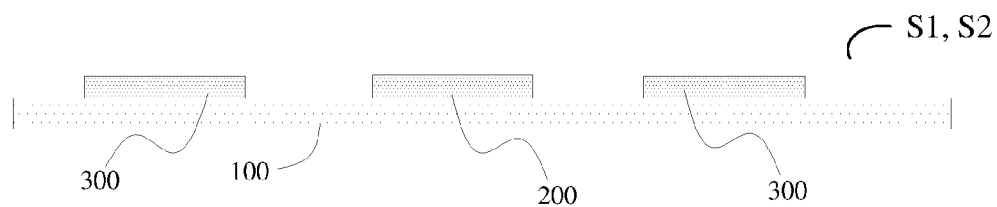
FIGS. 3(a)-3(f) are schematic diagrams showing structures of the phase shifter shown in FIG. 1 in respective steps of a method for manufacturing the phase shifter.
Figure 3B:
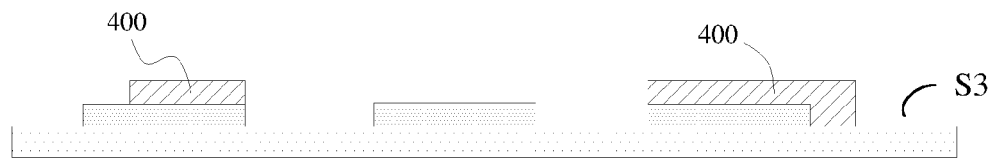
Figure 3C:
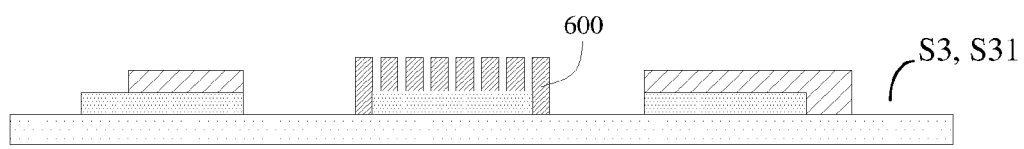

In step S31, a plurality of dielectric pillars 600 are formed on the signal line 200, such that the plurality of dielectric pillars 600 are vertically disposed on the surface of the signal line 200 proximal to the bridge floor structure 510, and a material of each of the plurality of dielectric pillars 600 includes a ferroelectric material, as shown in FIGS. 3(b) to 3(c). For example, the ferroelectric material may include at least one of: a lead zirconate titanate piezoelectric ceramic (which may be simply referred to as "PZT"), barium titanium oxide (BaTiO, which may be simply referred to as "BTO"), lead magnesium niobate-lead titanate (Pb(Mg$_{1/3}$Nb$_{2/3}$)O$_3$—PbTiO$_3$, which may be simply referred to as "PMNPT"), and bismuth iron oxide (BiFeO$_3$, which may be simply referred to as "BFO").

Figure 3D:
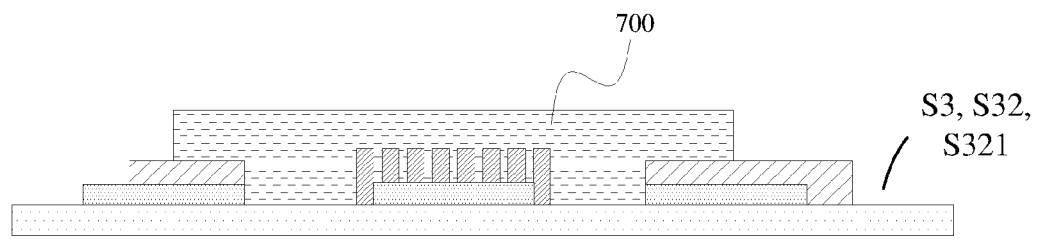
Figure 3E:
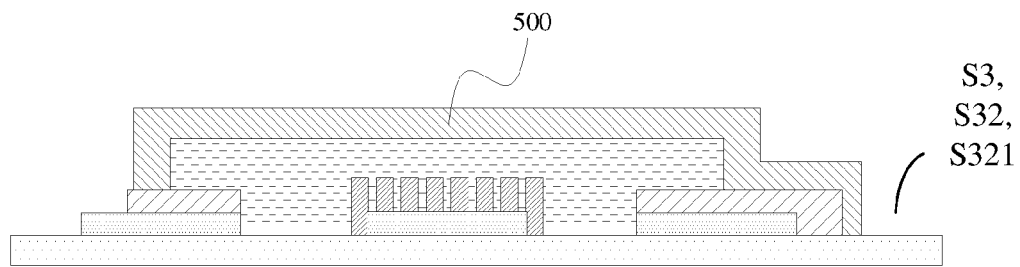
Figure 3F:
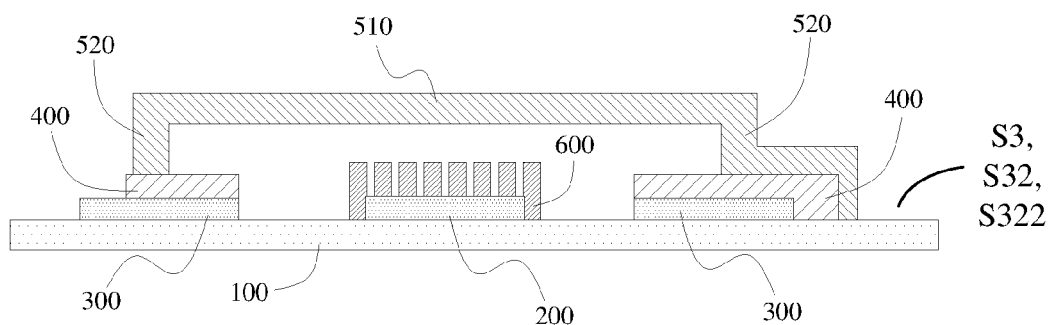

In step S32, the film bridge 500 is formed, as shown in FIGS. 3(d) to 3(f).

To improve the product yield of the phase shifter, as an example, a dimension of a cross section (e.g., the maximum of dimensions of the cross section in various directions) of each of the dielectric pillars 600 as shown in FIGS. 3(e) and 3(f) is in an order of nanometer, and each of the dielectric pillars 600 is formed by using a mask growth method.

Specifically, a porous Anodic Aluminum Oxide (AAO) mask may be used for mask growth to obtain a nano-pillar ferroelectric layer (i.e., a film including the plurality of dielectric pillars 600). In the present embodiment, the ferroelectric dielectric is formed into a structure of the nano-pillars, which on one hand reduces the adhesion effect when the plurality of dielectric pillars 600 and the film bridge 500 made of a metal material are mutually adsorbed and in contact with each other, and prevents the film bridge being unable to continue to operate due to the collapse of the film bridge 500 caused by the electrostatic effect of the residual charges. On the other hand, the adoption of the structure of the nano-pillars is further beneficial to the polarization orientations of the ferroelectric dielectric during growth to be the same, thereby facilitating subsequent polarization processes or even reducing the subsequent polarization processes, and improving the product quality and the production efficiency.

In order to improve the safety of the phase shifter and prevent the film bridge 500 from contacting the ground lines 300 to cause an electric leakage, as shown in FIGS. 3(a) to 3(b), the method further includes, before step S31: forming an insulating isolation layer 400 on the ground line 300. For example, the insulating isolation layer 400 may be made of an organic insulating material such as a resin or an inorganic insulating material such as SiO$_2$.

A method for forming the suspended bridge floor of the film bridge 500 is not particularly limited in an embodiment of the present disclosure. For example, step S32 may optionally include the following steps S321 and S322.

In step S321, a sacrificial layer 700 is formed on the signal line 200 and the dielectric pillars 600, and at least one film bridge is formed on the sacrificial layer 700 and the two ground lines 300, such that both ends of each of the at least one film bridge are located on the two ground lines 300, respectively, as shown in FIGS. 3(c) to 3(e). For example, the sacrificial layer 700 may be formed on the substrate 100, the signal line 200, and each of the insulating isolation layers 400 to expose a portion of each of the insulating isolation layers 400, and the film bridge 500 may be formed on the sacrificial layer 700 and respectively on the two ground lines 300 (i.e., respectively on the exposed portions of the two insulating isolation layers 400 on the two ground lines 300). For example, the sacrificial layer 700 may be made of a photoresist.

In step S322, the sacrificial layer 700 is removed (i.e., the sacrificial layer is released), as shown in FIGS. 3(e) to 3(f). For example, the sacrificial layer 700 may be removed by an etching process (e.g., a dry etching process).

In other embodiments of the present disclosure, the phase shifter may also be manufactured by a bonding process. That is, the inverted film bridge 500 is separately formed on another substrate, and this substrate and the substrate (as shown in FIG. 3 (c)) on which the signal line 200, the ground lines 300 and the plurality of dielectric pillars 600 are formed are aligned with each other and assembled into a cell, such that each of the connection walls 520 of the film bridge 500 is connected to (the insulating isolation layer 400 on) the corresponding ground line 300; and the another substrate previously used for forming the film bridge 500 is removed.

It should be understood that the method for manufacturing a phase shifter may further include a step for forming another component of the phase shifter according to any one of the foregoing embodiments of the present disclosure, in addition to steps S1, S2, S3, S31, S32, S321 and S322 as described above.

Figure 11:
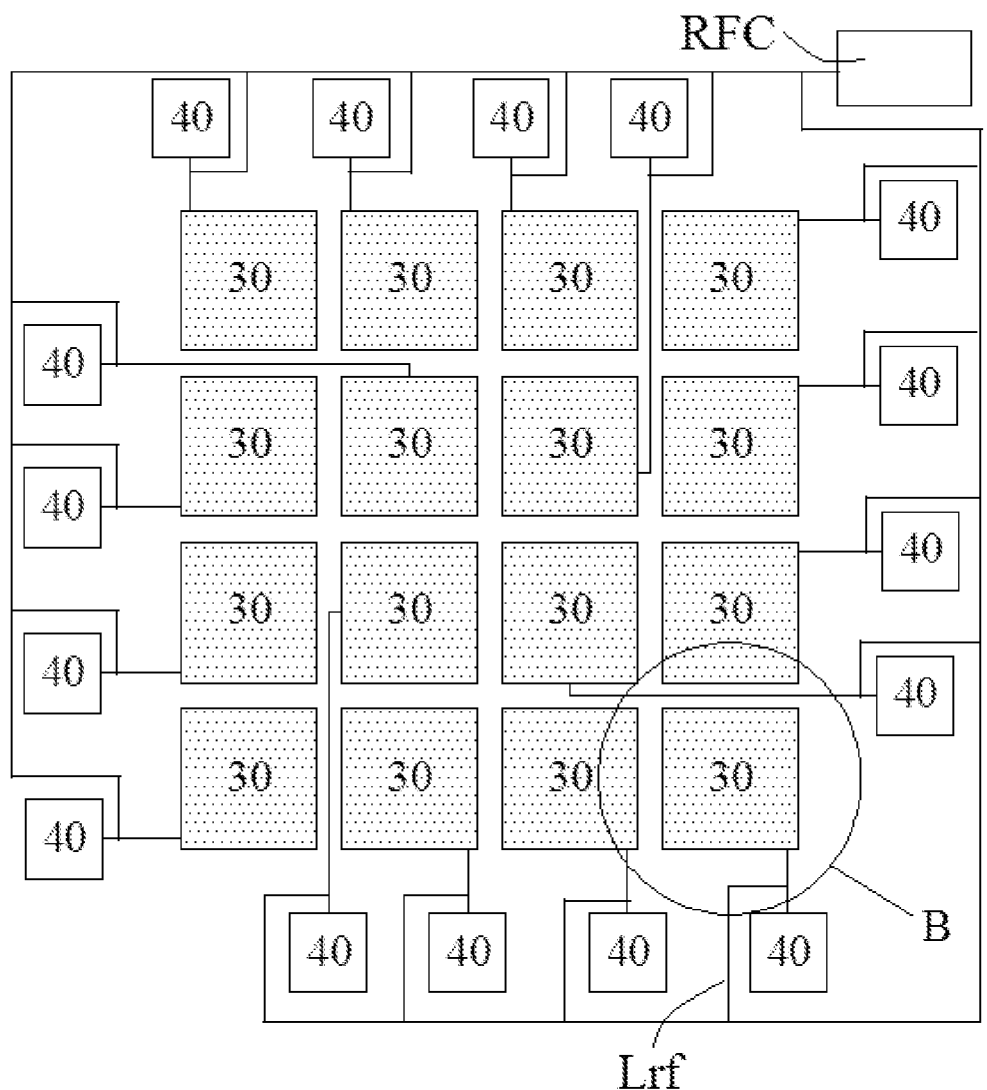
FIG. 11 is a schematic diagram showing a structure of an antenna device according to an embodiment of the present disclosure.
Figure 12:
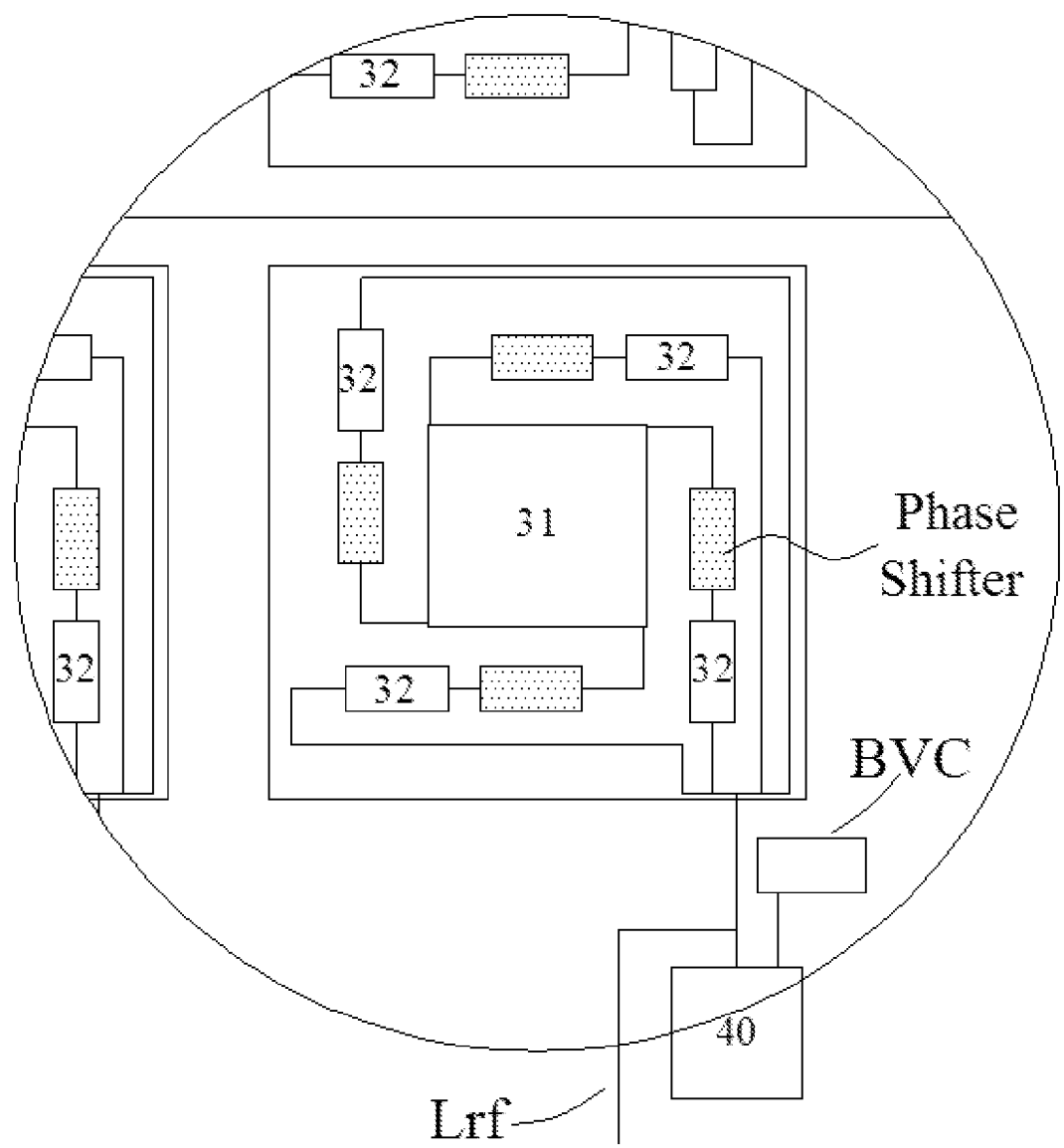
FIG. 12 is an enlarged schematic diagram of a region B shown in FIG. 11, where like features are denoted by the same reference labels throughout the detail description of the drawings.

As a third aspect of the present disclosure, there is provided an antenna device, as shown in FIGS. 11 and 12. The antenna device includes a plurality of antenna units 30 (FIG. 11) and a radio frequency signal supply circuit RFC (which may be a conventional radio frequency signal supply circuit). The plurality of antenna units 30 are arranged in rows and columns to form an array. Each of the antenna units 30 includes a radio frequency antenna 31 (FIG. 12) and at least one phase shifter connected to the radio frequency antenna 31, and the radio frequency signal supply circuit RFC (FIG. 11) may supply (or provide) a radio frequency signal to the radio frequency antenna 31 through the at least one phase shifter via a connection line Lrf. Each of the at least one phase shifter is the phase shifter according to any one of the foregoing embodiments of the present disclosure. Each of the antenna units 30 further includes a bias voltage supply circuit BVC (which may be a conventional bias voltage supply circuit), as shown in FIG. 12, for supplying a bias voltage to the capacitance adjusting component of each of the at least one phase shifter.

In the antenna device according to the present embodiment, the capacitance adjusting component of each phase shifter can adjust the capacitance between the film bridge 500 and the signal line 200 to a target capacitance according to the magnitude of the bias voltage, and the target capacitance can be freely changed within a certain range according to the magnitude of the bias voltage. That is, during an operation of each phase shifter, the capacitance between a single film bridge 500 and the signal line 200 can be continuously adjusted, and thus the phase of the radio frequency signal transmitted on the signal line 200 can be continuously adjusted through the single film bridge 500, thereby greatly improving the phase shifting capability of the phase shifter.

In order to improve the stability of the antenna device, as shown in FIGS. 11-12, the antenna device further includes a plurality of main switch units 40 connected in one-to-one correspondence with the plurality of antenna units 30. Each antenna unit 31 further includes at least one sub-switch unit 32 in one-to-one correspondence with the at least one phase shifter, and each phase shifter is connected to a corresponding main switch unit 40 through a corresponding sub-switch unit 32, as shown in FIG. 12. The bias voltage supply circuit BVC may supply a control signal to the at least one sub-switch unit 32 through each main switch unit 40, such that the at least one sub-switch unit 32 is selectively turned on, and each phase shifter may provide a radio frequency signal to the corresponding radio frequency antenna 31 when the corresponding sub-switch unit is turned on.

In the present embodiment, an operating state of each antenna unit 30 is controlled by an independent main switch unit 40, and the antenna unit 30 may include a plurality of phase shifters, which are connected in series with a plurality of sub-switch units 32, respectively, according to any one of the foregoing embodiments of the present disclosure. In consideration of the problem of poor consistency that may exist due to a complex manufacturing process of the MEMS phase shifters, in the present embodiment, the plurality of phase shifters are exemplarily disposed in each antenna unit, such that phase shifters with similar operating states and stable performance can be selected through experiment and adjustment, and be driven to operate by controlling the corresponding sub-switch units 32 by the corresponding main switch units 40, thereby mitigating the problem of low yield of products each including an array of the MEMS phase shifters caused by poor consistency between the MEMS phase shifters. As such, the maintenance cost of the products is reduced, the stability of a system is enhanced, and the feasibility of integrating the MEMS phase shifter into an array is improved.

A circuit structure of each main switch unit 40 and a circuit structure of each sub-switch unit 32 are not particularly limited in an embodiment of the present disclosure. For example, each of the main switch units 40 or each of the sub-switch units 32 may optionally include a thin film transistor (TFT).

As another alternative embodiment of the present disclosure, each of the main switch units 40 may also be a MEMS switch, such as a single-pole double-throw switch or a single-pole multi-throw switch (e.g., a MEMS single-pole four-throw switch), to enable a part of the plurality of phase shifters of each antenna unit 30 to be turned on by the plurality of sub-switch units 32. Such a structure of each of the main switch units 40 may be manufactured by a MEMS phase shifter manufacturing process.

It is to be understood that the foregoing embodiments of the present disclosure may be combined with each other in a case of no explicit conflict.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A phase shifter, comprising: a substrate, a signal line on the substrate, pairs of ground lines on the substrate, and a capacitance adjusting component, wherein two ground lines in a same pair of ground lines are on opposite sides of the signal line and spaced apart from the signal line, respectively, the capacitance adjusting component comprises a film bridge, the film bridge includes opposite ends that are on the two ground lines, respectively, the signal line is in a space enclosed by the film bridge and the substrate, the capacitance adjusting component is configured to adjust a capacitance between the film bridge and the signal line to a target capacitance when the capacitance adjusting component receives a bias voltage, and the target capacitance has a linear correlation with a magnitude of the bias voltage; and the film bridge comprises two connection walls and a bridge floor structure that is opposite to the substrate, the two connection walls are connected to opposite ends of the bridge floor structure, respectively, and are on the two ground lines, respectively, the bridge floor structure comprises an electrode portion, two adsorption portions, and a plurality of first connection bars, the electrode portion is opposite to the signal line, the two adsorption portions are connected to both sides of the electrode portion, respectively, each of the two adsorption portions is connected to one of the two connection walls through the plurality of first connection bars, and the two adsorption portions correspond to positions of the two ground lines, respectively.

2. The phase shifter according to claim 1, wherein the capacitance adjusting component further comprises a plurality of dielectric pillars which are vertically on a surface of the signal line proximal to the bridge floor structure, and each of the plurality of dielectric pillars comprises a ferroelectric material.

3. The phase shifter according to claim 2, wherein a cross section of each of the plurality of dielectric pillars has a shape of a circle, a triangle, or a rectangle.

4. The phase shifter according to claim 2, wherein each of the plurality of dielectric pillars is a cylinder, a triangular prism, or a quadrangular prism.

5. The phase shifter according to claim 2, wherein a dimension of the electrode portion is greater than a dimension of the signal line in a direction perpendicular to an extension direction of the signal line, and the phase shifter further comprises a plurality of additional dielectric pillars which are vertically on the substrate and at a periphery of the plurality of dielectric pillars.

6. The phase shifter according to claim 5, wherein the electrode portion at least partially overlaps the signal line in a direction perpendicular to the substrate.

7. The phase shifter according to claim 2, wherein the ferroelectric material comprises at least one of a lead zirconate titanate piezoelectric ceramic (PZT), barium titanium oxide (BaTiO), lead magnesium niobate-lead titanate (PMNPT), and bismuth iron oxide (BiFeO$_3$).

8. The phase shifter according to claim 2, wherein a respective central axis of each of the plurality of dielectric pillars is perpendicular to the substrate.

9. An antenna device, comprising a plurality of antenna units and a radio frequency signal supply circuit, wherein each of the plurality of antenna units comprises a respective radio frequency antenna and at least one phase shifter connected to the respective radio frequency antenna, the radio frequency signal supply circuit is configured to supply a radio frequency signal to the respective radio frequency antenna through the at least one phase shifter, each of the at least one phase shifter is the phase shifter according to claim 1, and each of the plurality of antenna units further comprises a bias voltage supply circuit configured to supply the bias voltage to the capacitance adjusting component of each of the at least one phase shifter.

10. The antenna device according to claim 9, further comprising a plurality of main switch units connected in one-to-one correspondence with the plurality of antenna units, and each antenna unit further comprising at least one sub-switch unit in one-to-one correspondence with the at least one phase shifter, wherein each phase shifter is connected to the main switch unit corresponding to the antenna unit comprising the phase shifter through a corresponding sub-switch unit, the bias voltage supply circuit is configured to supply a control signal to the at least one sub-switch unit through a corresponding main switch unit, so as to selectively turn on the at least one sub-switch unit, and each phase shifter is configured to provide a radio frequency signal to the radio frequency antenna when the corresponding sub-switch unit is turned on.

11. The phase shifter according to claim 1, wherein the bridge floor structure further comprises a plurality of second connection bars, and each of the two adsorption portions is connected to the electrode portion through the plurality of second connection bars.

12. The phase shifter according to claim 11, wherein the plurality of first connection bars comprises two first connection bars, the plurality of second connection bars comprises two second connection bars, each of the two adsorption portions is connected to one of the two connection walls through the two first connection bars, and is connected to the electrode portion through the two second connection bars.

13. A phase shifter, comprising: a substrate, a signal line on the substrate, pairs of ground lines on the substrate, and a capacitance adjusting component, wherein
two ground lines in a same pair of ground lines are on opposite sides of the signal line and spaced apart from the signal line, respectively, the capacitance adjusting component comprises a film bridge, the film bridge includes opposite ends that are on the two ground lines, respectively, the signal line is in a space enclosed by the film bridge and the substrate, the capacitance adjusting component is configured to adjust a capacitance between the film bridge and the signal line to a target capacitance when the capacitance adjusting component receives a bias voltage, and the target capacitance has a linear correlation with a magnitude of the bias voltage; and
the phase shifter further comprises a first switch unit on the substrate, and the first switch unit is configured to provide the bias voltage to the film bridge upon receiving a first control signal.

14. An antenna device, comprising a plurality of antenna units and a radio frequency signal supply circuit, wherein each of the plurality of antenna units comprises a respective radio frequency antenna and at least one phase shifter connected to the respective radio frequency antenna, the radio frequency signal supply circuit is configured to supply a radio frequency signal to the respective radio frequency antenna through the at least one phase shifter, each of the at least one phase shifter is the phase shifter according to claim 13, and each of the plurality of antenna units further comprises a bias voltage supply circuit configured to supply the bias voltage to the capacitance adjusting component of each of the at least one phase shifter.

15. The phase shifter according to claim 13, further comprising a second switch unit on the substrate, and the second switch unit is configured to electrically connect the signal line to the film bridge upon receiving a second control signal.

16. The phase shifter according to claim 15, wherein the second switch unit comprises a second switch transistor, which has a first electrode connected to the film bridge, a second electrode connected to the signal line, and a control electrode for receiving the second control signal, and the second switch transistor is configured to electrically connect the signal line to the film bridge when the control electrode receives the second control signal.

17. The phase shifter according to claim 13, wherein the first switch unit is further configured to electrically connect the signal line to the film bridge upon receiving a second control signal.

18. The phase shifter according to claim 17, wherein the first switch unit is a MEMS single-pole double-throw switch.

19. The phase shifter according to claim 13, wherein the first switch unit has a bias voltage input terminal, a first output terminal, and a first control terminal, the bias voltage input terminal is configured to receive the bias voltage, the first output terminal is electrically connected to the film bridge, and the first switch unit is configured to electrically connect the first output terminal to the bias voltage input terminal when the first control terminal receives the first control signal.

20. The phase shifter according to claim 19, wherein the first switch unit comprises a first switch transistor, which has a first electrode serving as the bias voltage input terminal of the first switch unit, a second electrode serving as the first output terminal of the first switch unit, and a control electrode serving as the first control terminal of the first switch unit, and the first switch transistor is configured to electrically connect the first electrode to the second electrode when the control electrode receives the first control signal.

* * * * *